(12) United States Patent
Biskeborn

(10) Patent No.: US 7,916,424 B2
(45) Date of Patent: Mar. 29, 2011

(54) MAGNETIC HEAD WITH WEAR RESISTANT PORTION BETWEEN AN OVERCOAT FORMED ABOVE A TRANSDUCER OF THE MAGNETIC HEAD AND A MEDIA-PROXIMAL SURFACE OF THE MAGNETIC HEAD

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 11/745,368

(22) Filed: May 7, 2007

(65) Prior Publication Data

US 2008/0278854 A1 Nov. 13, 2008

(51) Int. Cl.
*G11B 5/187* (2006.01)
(52) U.S. Cl. ....................................................... 360/122
(58) Field of Classification Search .................... 360/122
See application file for complete search history.

(56) References Cited

U.S. PATENT DOCUMENTS

| | | | | |
|---|---|---|---|---|
| 4,387,410 | A * | 6/1983 | Takanohashi et al. | 360/118 |
| 6,922,317 | B2 * | 7/2005 | Kirschenbaum et al. | 360/317 |
| 7,137,190 | B2 * | 11/2006 | Hsiao et al. | 29/603.08 |
| 2002/0034055 | A1 | 3/2002 | Seyama et al. | 360/324.11 |
| 2003/0193759 | A1 | 10/2003 | Hayashi | 360/324.1 |
| 2004/0066573 | A1 | 4/2004 | Hsiao et al. | 360/122 |

FOREIGN PATENT DOCUMENTS

JP 59-168913 9/1984

* cited by examiner

*Primary Examiner* — A. J. Heinz
(74) *Attorney, Agent, or Firm* — Zilka-Kotab, PC

(57) ABSTRACT

A magnetic head according to one embodiment includes a substrate; at least one transducer formed above the substrate, the at least one transducer being selected from a group consisting of a reader and a writer; an overcoat portion formed above the at least one transducer; and a wear resistant portion formed between the overcoat portion and a media-proximal surface of the magnetic head, the wear resistant portion being formed of a material having a greater resistance to media wear than a material from which the overcoat portion is formed.

20 Claims, 17 Drawing Sheets

MAGNETIC HEAD WITH WEAR RESISTANT PORTION BETWEEN AN OVERCOAT FORMED ABOVE A TRANSDUCER OF THE MAGNETIC HEAD AND A MEDIA-PROXIMAL SURFACE OF THE MAGNETIC HEAD

FIELD OF THE INVENTION

The present invention relates to magnetic heads, and more particularly, this invention relates to a magnetic head having a wear resistant portion near the overcoat portion thereof.

BACKGROUND OF THE INVENTION

Business, science and entertainment, applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. Data storage density can be increased because AMR and GMR sensors offer signal levels higher than those available from conventional inductive read heads for a given read sensor width and so enable smaller reader widths and thus more tracks per inch. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

FIG. 1 illustrates a traditional flat-lapped bi-directional, two-module magnetic tape head 100, in accordance with the prior art. As shown, the head includes a pair of bases 102, each equipped with a module 104. The bases are typically "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Two common parameters are associated with heads of such design. One parameter includes the tape wrap angles $\alpha_i$, $\alpha_o$ defined between the tape 108 and a plane 111 in which the upper surface of the tape bearing surface 109 resides. It should be noted that the tape wrap angles $\alpha_i$,$\alpha_o$ includes an inner wrap angle $\alpha_i$ which is often similar in degree to an external, or outer, wrap angle $\alpha_o$. The tape bearing surfaces 109 of the modules 104 are set at a predetermined angle from each other such that the desired inner wrap angle $\alpha_i$ is achieved at the facing edges. Moreover, a tape bearing surface length 112 is defined as the distance (in the direction of tape travel) between edges of the tape bearing surface 109. The wrap angles $\alpha_i$, $\alpha_o$ and tape bearing surface length 112 are often adjusted to deal with various operational aspects of heads such as that of FIG. 1, in a manner that will soon become apparent.

During use of the head of FIG. 1, various effects traditionally occur. FIG. 2A illustrates a first known effect associated with the use of the head 100 of FIG. 1. When the tape 108 moves across the head as shown, air is skived from below the tape 108 by a skiving edge 204 of the substrate 104A, and instead of the tape 108 lifting from the tape bearing surface 109 of the module (as intuitively it should), the reduced air pressure in the area between the tape 108 and the tape bearing surface 109 allows atmospheric pressure to urge the tape towards the tape bearing surface 109.

Regarding additional effects, it has also often been observed that the tape tends to exhibit tape lifting 205, or curling, along the side edge of the tape bearing surface 109 as a result of air leaking in at the edges and tape mechanical effects. This effect is shown in FIG. 2B. Particularly, the edges of the tape curl away from the tape bearing surface 109, resulting in edge loss or increased spacing between the edges of the tape and the tape bearing surface 109 as well as results in additional stress at points 206 which, in turn, may cause additional wear. Further augmenting such tape lifting 205 is the fact that many types of tape 108 naturally have upturned edges due to widespread use of technology applied in the video tape arts.

Allowing the media to contact the head often provides the best possible signal, as the effects of spacing loss are at a minimum. However, one problem with media-head contact is that of wear, particularly near the elements 106. FIG. 2C illustrates the head 100 of FIG. 1 prior to significant tape-induced wear. As shown in the detail, the readers and writers 106 are formed above the substrate 104A. An overcoat 150 is typically formed above the readers and writers 106 during fabrication.

FIG. 2D illustrates the same head 100 after wear has occurred. As shown in FIG. 2D, the overcoat 150, typically formed of alumina, tends to erode more rapidly than other portions of the head in contact with the moving tape. As the overcoat recedes, materials forming and surrounding the readers and writers 106 tend to wear more rapidly due to loss of overcoat support, as shown in FIG. 2E.

The resultant recession is detrimental because the magnetic medium does not conform well to the recessed region, thus resulting in spacing loss. The spacing loss is such that high frequencies are attenuated more than low frequencies. As is well, known, high frequency loss due to increased magnetic spacing between tape and recording elements tends to degrade drive performance, which is characterized by an increase in read errors.

The only known solutions for controlling erosion are to use low deposition rate aluminum oxide for the overcoat, which adds significantly to processing time; or to reduce the substrate-closure spacing, but write coil design requirements force a relatively large lower bound in this approach.

SUMMARY OF THE INVENTION

A magnetic head according to one embodiment includes a substrate; at least one transducer formed above the substrate, the at least one transducer being selected from a group consisting of a reader and a writer; an overcoat portion formed above the at least one transducer; and a wear resistant portion formed between the overcoat portion and a media-proximal surface of the magnetic head, the wear resistant portion being formed of a material having a greater resistance to media wear than a material from which the overcoat portion is formed.

A magnetic head according to another embodiment includes a substrate; at least one transducer formed above the substrate, the at least one transducer being selected from a group consisting of a reader and a writer; an overcoat portion formed above the at least one transducer; a closure positioned above the overcoat portion; and a wear resistant portion formed between the overcoat portion and a media-proximal surface of the magnetic head, the wear resistant portion being formed of a material that moderates electric fields emanating from the closure.

A magnetic head according to yet another embodiment includes a substrate; at least one writer having a write pole and being formed above the substrate; an overcoat portion formed above the at least one writer; and a wear resistant portion formed at least partially between the write pole and a lapped surface of the magnetic head, the wear resistant portion being formed of a material having a greater resistance to media wear than a material from which the overcoat portion is formed.

Any of these embodiments may be implemented in a tape drive system, which may include a magnetic head as recited above, a drive mechanism for passing a magnetic recording tape over the magnetic head, and a controller electrically coupled to the magnetic head.

A method for forming a magnetic head according to one embodiment includes forming at least one transducer above a substrate, the at least one transducer being selected from a group consisting of a reader and a writer; forming an overcoat portion above the at least one transducer; and forming a wear resistant portion, before or after forming the overcoat portion, such that the wear resistant portion is positioned between the overcoat portion and a media-proximal surface of the magnetic head upon forming both the overcoat portion and the wear resistant portion, the wear resistant portion being formed of a material having a greater resistance to media wear than a material from which the overcoat portion is formed.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

Prior Art

Prior Art

Prior Art

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Some embodiments described below disclose a new head design that reduces media-induced wear. Other embodiments disclose a new head design that moderates peripheral electric fields. Further embodiments provide both benefits.

In one general approach, a magnetic head includes a substrate; at least one transducer formed above the substrate, the at least one transducer being selected from a group consisting of a reader and a writer; an overcoat portion formed above the at least one transducer; and a wear resistant portion formed between the overcoat portion and a media-proximal surface of the magnetic head, the wear resistant portion being formed of a material having a greater resistance to media wear than a material from which the overcoat portion is formed.

In another general approach, a magnetic head includes a substrate; at least one transducer formed above the substrate, the at least one transducer being selected from a group consisting of a reader and a writer; an overcoat portion formed above the at least one transducer; a closure positioned above the overcoat portion; and a wear resistant portion formed between the overcoat portion and a media-proximal surface of the magnetic head, the wear resistant portion being formed of a material that moderates electric fields emanating from the closure.

While the following description will be described in terms of a tape storage system for clarity and to place the invention in context, it should be kept in mind that the teachings herein may have broad application to all types of magnetic recording.

Figure 3:
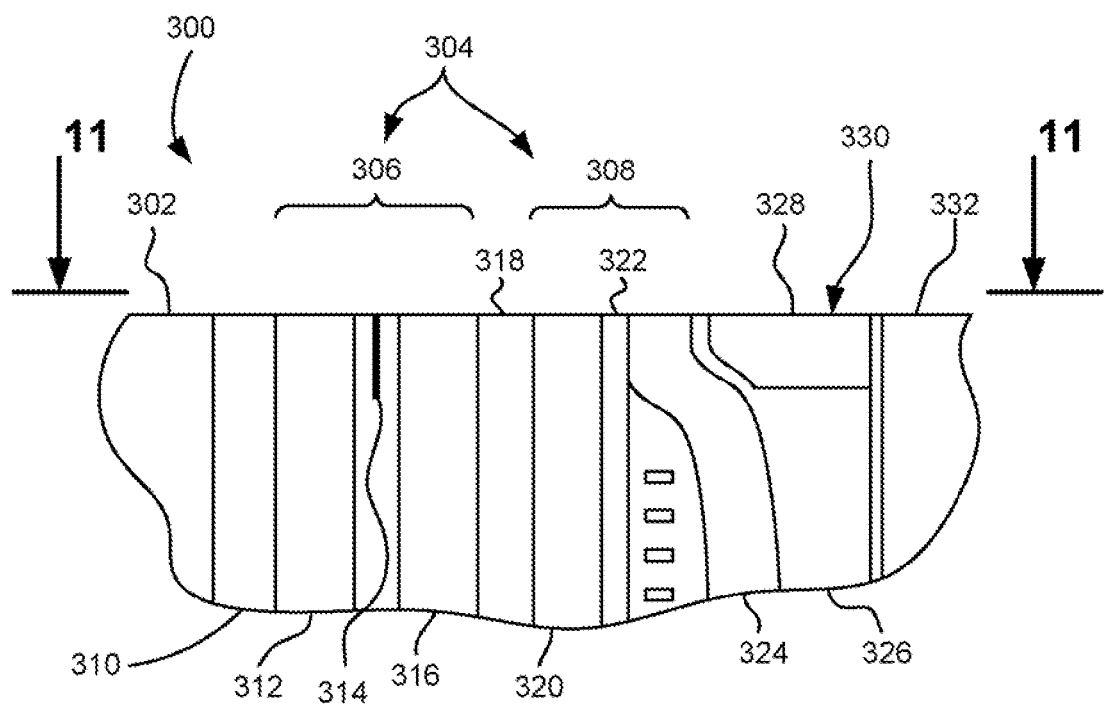
FIG. 3 is a partial cross sectional view of a magnetic head according to one embodiment of the present invention.

FIG. 3 illustrates a magnetic head 300 according to one illustrative embodiment. As shown, the magnetic head includes a substrate 302. One or more transducers 304 are formed above the substrate. In the embodiment shown, the transducers 304 include a reader 306 and writer 308 in a "piggyback" configuration. However, in other embodiments, only readers may be present, only writers may be present, or both readers and writers may be present but in a different configuration such as writer-formed first, an offset (misaligned) configuration, interleaved configuration, etc.

In the embodiment shown in FIG. 3, the various layers formed above the substrate 302 may include an undercoat portion 310, a first shield 312, a second shield 316, a sensor 314 formed between the shields 312, 316, a second separation layer 318, a lower write pole 320, a write gap layer 322, an upper write pole 324, an overcoat portion 326, and a wear resistant portion 328 formed between the overcoat portion 326 and a media-proximal surface 330 of the magnetic head. Note that in variations and permutations of the present invention, layers may be added or removed. For instance, the second shield 316 and lower write pole 320 may be merged into a single layer. The media-proximal surface can generally be defined as the surface which faces the magnetic medium during use of the head in conjunction with reading from or writing to the medium. The media-proximal surface may or may not be the lapped surface defined upon lapping of the structure from the wafer.

Figure 11:
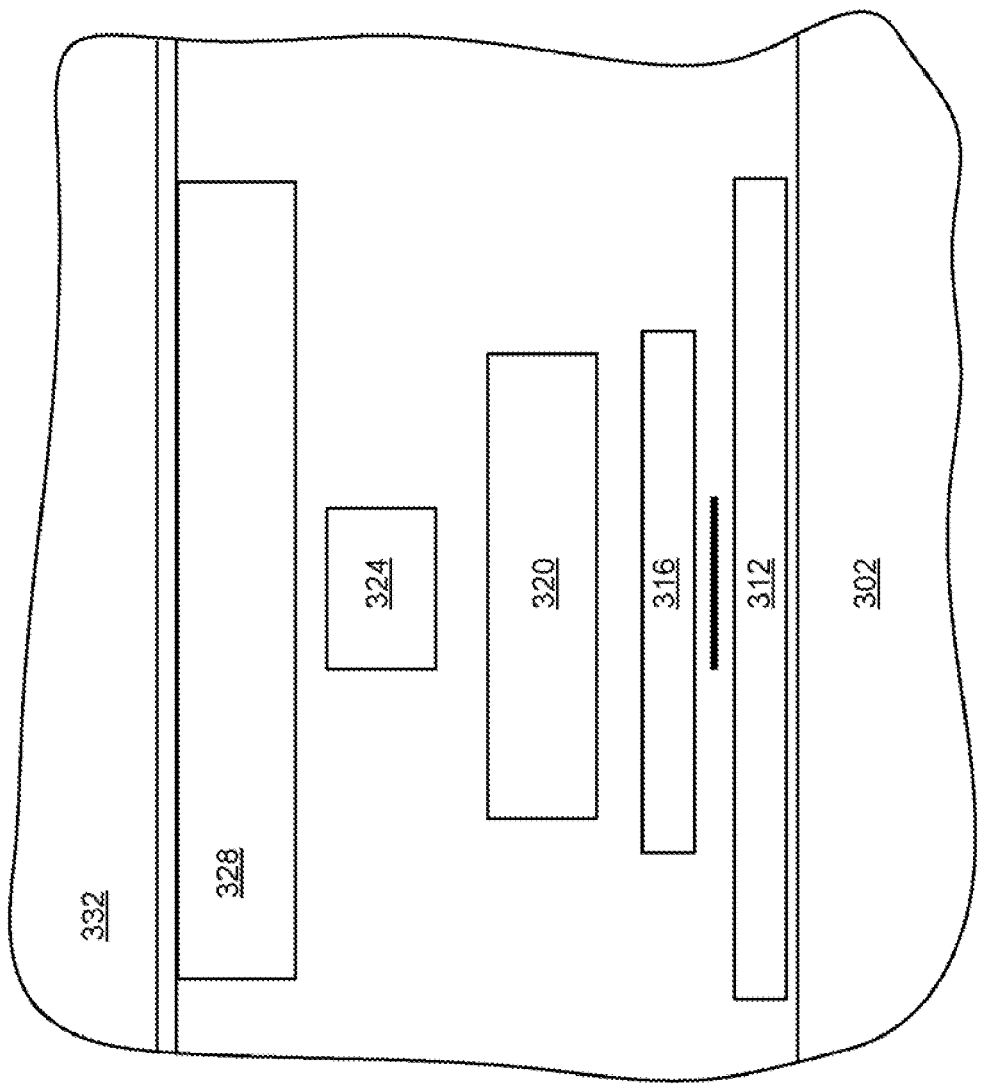
FIG. 11 is a side view taken along line 11-11 of FIG. 3.

FIG. 11 is a side view taken along line 11-11 of FIG. 3.

The various layers 310-326 may be formed of conventional materials known in the art, and by conventional processes known in the art. Typically, the overcoat portion 326 is formed of sputtered alumina or other electrically insulative material. The write poles 320, 324 are typically formed of an iron alloy such as nickel iron, cobalt iron, etc. One preferred material for the write poles 320, 324 is plated 45/55 nickel/iron alloy.

Figure 1:
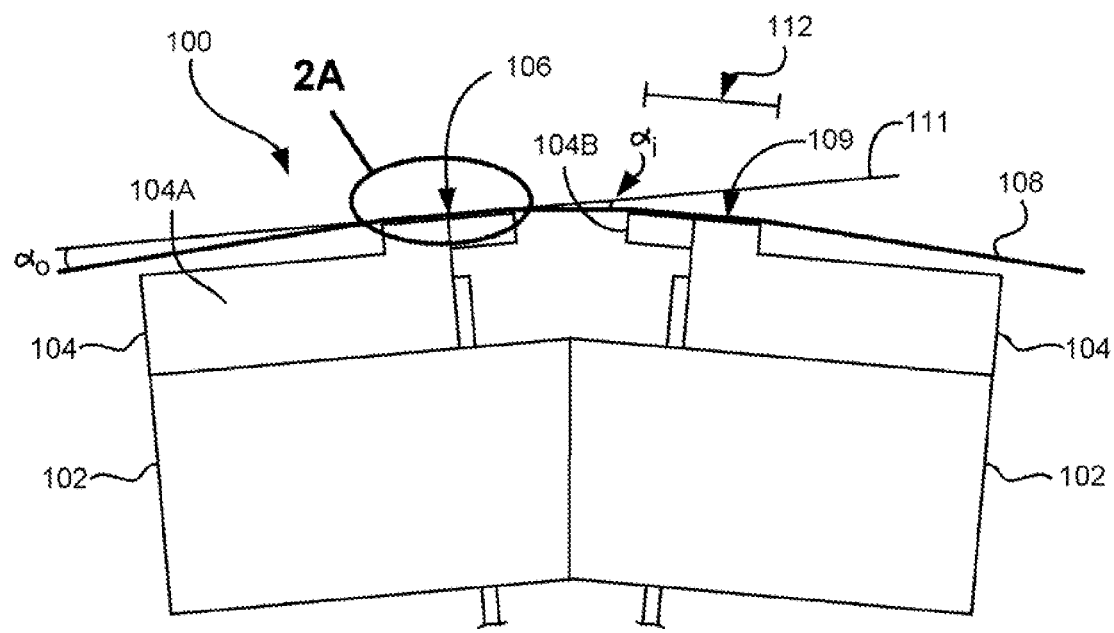
FIG. 1 illustrates a traditional flat-lapped magnetic tape head, in accordance with the prior art.
Figure 2A:
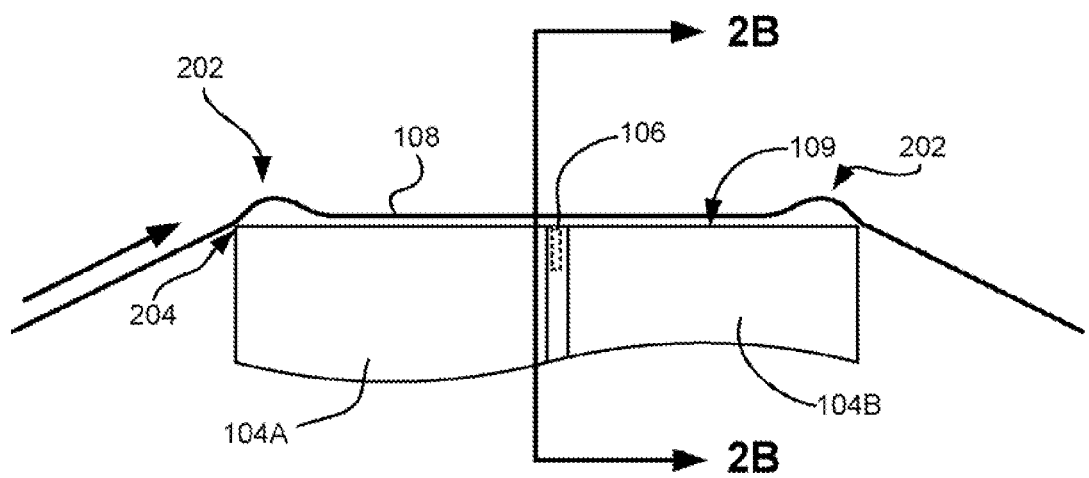
FIG. 2A is an enlarged view of Circle 2A of FIG. 1, showing a first and second known effect associated with the use of the head of FIG. 1.
Figure 2B:
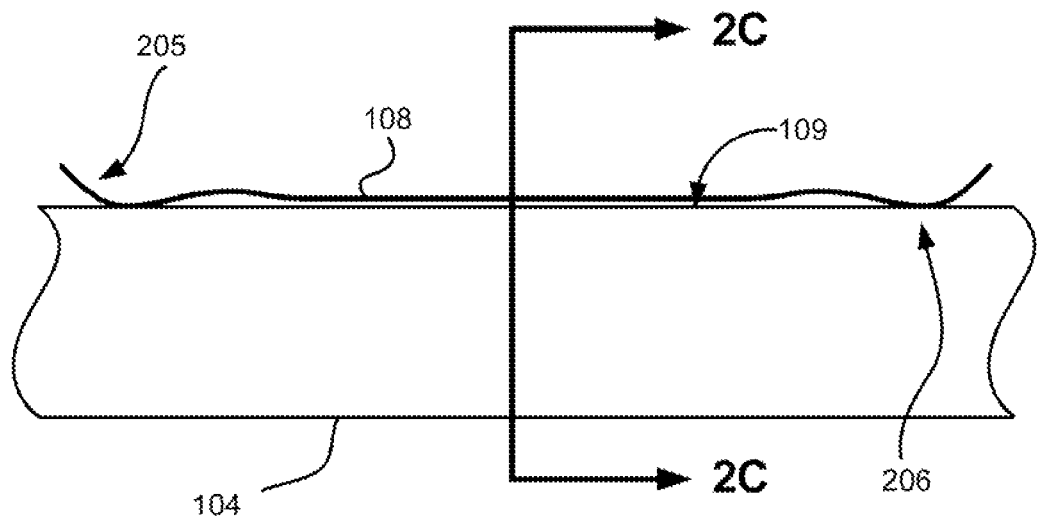
FIG. 2B is a cross-sectional view taken along Line 2B of FIG. 2A, showing a third known effect associated with the use of the head of FIG. 1.
Figure 2C:
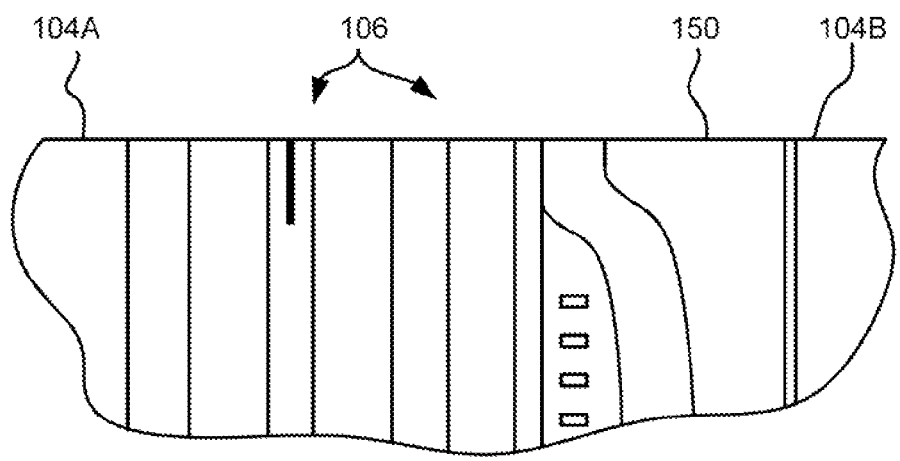
FIG. 2C is a partial cross-sectional view taken along Line 2C of FIG. 2B.
Figure 2D:
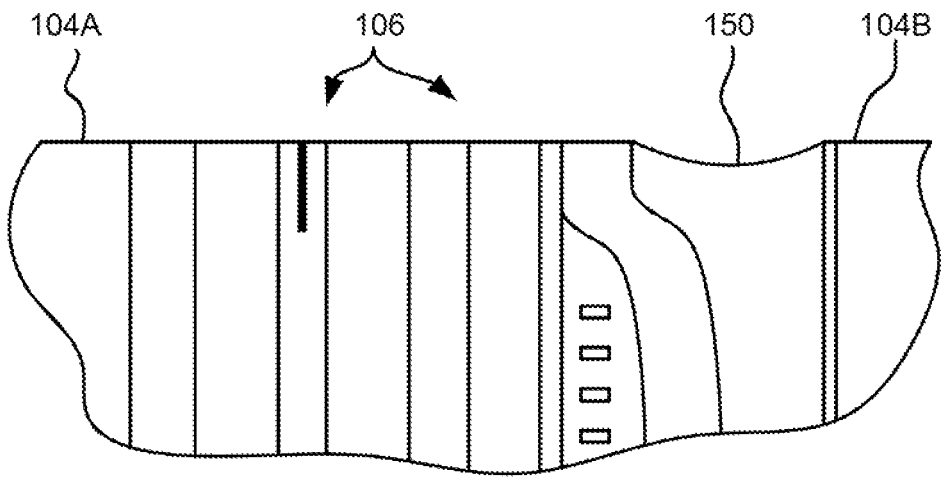
FIG. 2D is a view of the head of FIG. 2C illustrating the effect of media-induced wear.
Figure 2E:
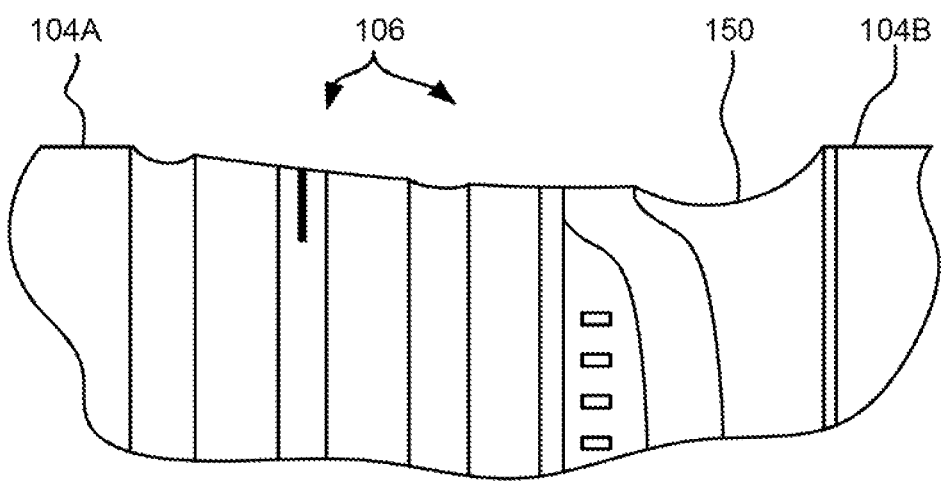
FIG. 2E is a partial cross-sectional view of the head of FIG. 2D illustrating the effect of additional media-induced wear.

In one embodiment, the wear resistant portion 328 is formed of a material having a greater resistance to media wear than a material from which the overcoat portion 326 is formed. Accordingly, media-induced media wear in the overcoat region, such as that shown in FIGS. 2D and 2E, is significantly reduced. It follows that the operable life of the head is significantly extended.

Referring again to FIG. 3, to simplify processing, the wear resistant portion 328 may be formed of a same material as the write pole(s) 320, 324, or a variation thereof Accordingly, the same plating bath used to form, the pole(s) may be used to form the wear resistant portion 328.

The wear resistant portion 328 may be constructed of any suitable material. One preferred material includes nickel and/or iron. For instance, the wear resistant portion 328 may be formed of a nickel iron alloy. In another example, the wear resistant portion 328 is formed of an aluminum-iron-silicon containing material, such as non-annealed sendust, which is very robust and corrosion resistant. In yet another example, the wear resistant portion 328 includes a nitrogenated iron-containing material.

In one particularly preferred approach, the overcoat region near the media-proximal surface of the head is processed with a thin strip of plated 45/55 nickel iron alloy, which may be the same material that is used for the write poles. This material has well understood and excellent durability compared to typical overcoat materials such as sputtered aluminum oxide.

Magnetostriction of the overcoat region is not believed to be an issue for magnetic performance. Stress may be a concern in head design so it is preferable to use known low stress materials for the wear resistant portion 328.

In addition to, or instead of, providing improved wear, the wear resistant portion 328 may moderate (e.g., restrain, temper, regulate, or makes less intense) any stray electric fields from surrounding layers. For example, in a tape head, the wear resistant portion 328 may moderate stray electric fields from TiC in the closure 332. These fields were found by the inventor to be implicated in accumulations of tape materials on tape heads. Moderating the fields is expected to reduce the accumulations.

In any of the embodiments presented herein, the height, thickness and width of the wear resistant portion is not critical. In an illustrative embodiment, the wear resistant portion has a height of between about 1 and 20 micrometers as measured in a direction perpendicular to the media-proximal surface. The thickness as measured in a direction perpendicular to the plane of deposition of the material is preferably about the full thickness of the overcoat. In some embodiments it is preferable to electrically isolate the wear resistant portion from the nearest write pole, shield, or other layer. In others, it is not. In embodiments where the wear resistant portion is in electrical communication with the upper pole, it may be preferred to electically isolate the wear resistant portion from the closure.

Figure 4:
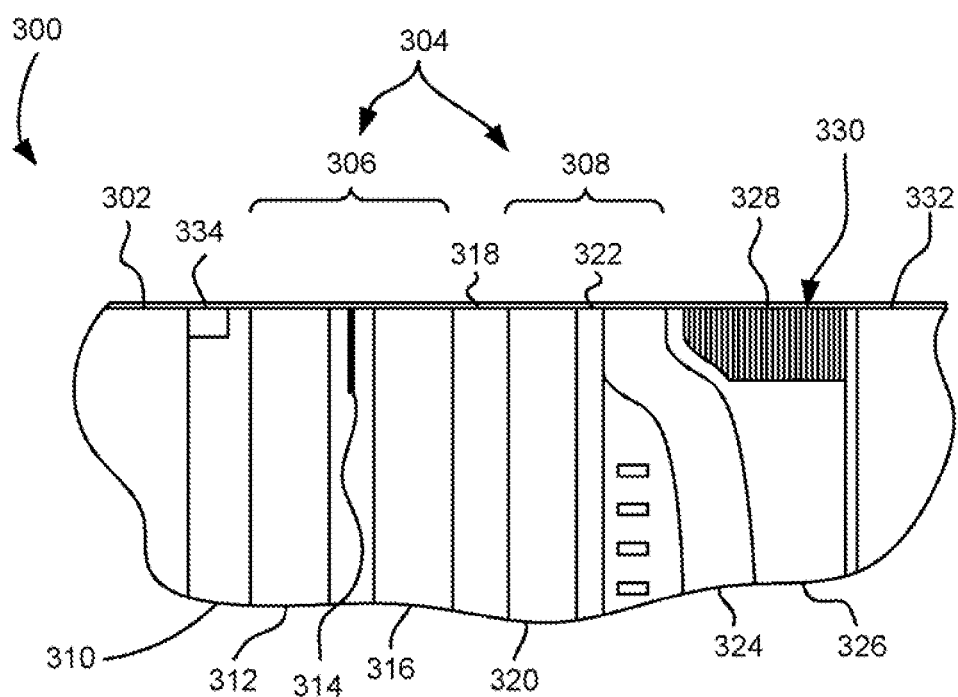
FIG. 4 is a partial cross sectional view of a magnetic head according to one embodiment of the present invention.

As shown in FIG. 4, the wear resistant portion 328 may also be a laminated structure, such as a laminated nitrogenated Fe/NiFe film, which is also very robust and corrosion resistant. Other suitable laminate materials include Fe/CoFe films, etc.

For increased durability, as also illustratively shown in FIG. 4, a protective coating 336 of a type known in the art may be formed along the media-proximal surface of the head. On magnetic heads, typical protective coatings 336 include diamond-like carbon, alumina, etc. Such protective coatings 336 protect the readers and writers from wear, corrosion, shorting, poor handling, etc.

The undercoat portion 326 may also include a wear resistant portion 334 having any of the properties described herein for the wear resistant portion 328 near the overcoat portion 326.

The invention is not limited to flat profile heads; heads having semi-cylindrical and other geometric tape bearing surfaces are also within the spirit and scope of the present invention.

A data storage system as described herein may include one or more of the following components. A device for interfacing with a data medium is present in some embodiments. For example, in a tape-based data storage system, a drive is used to read and write to tape, the drive including a bay for a tape cartridge. The data storage system may include a plurality of interface devices.

Figure 5:
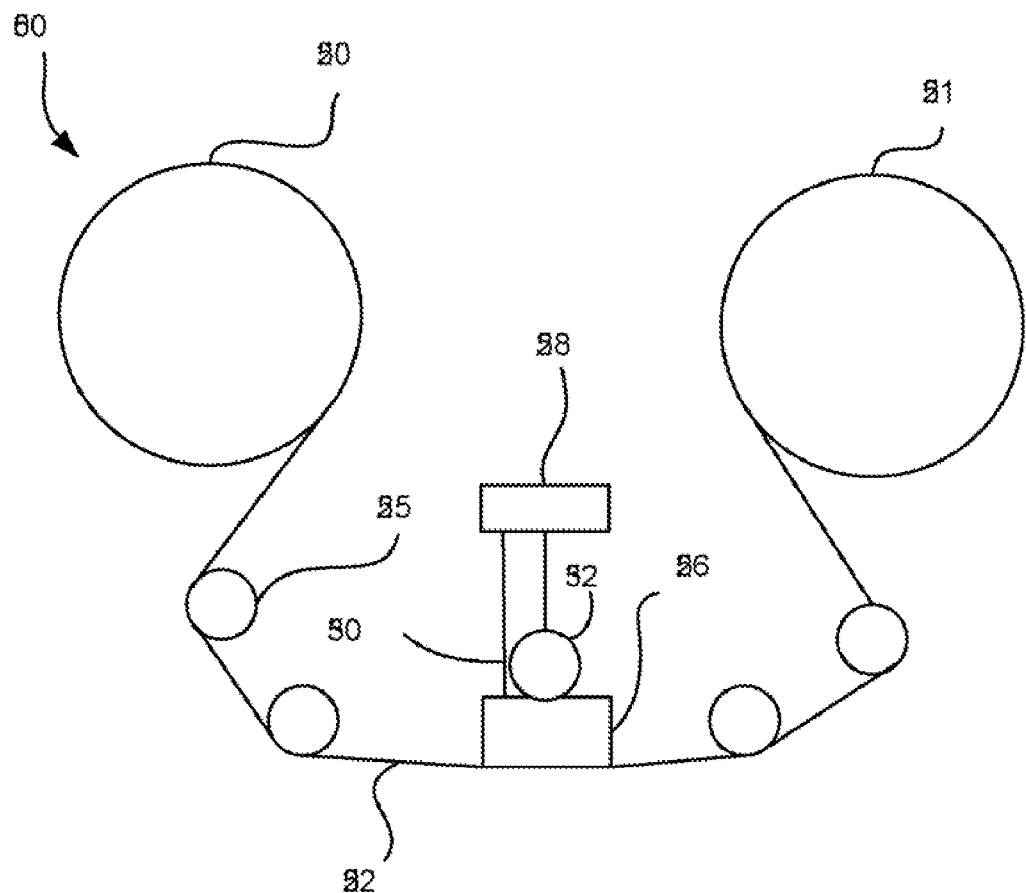
FIG. 5 is a schematic diagram of a tape drive system according to one embodiment of the present invention.

FIG. 5 illustrates a simplified tape drive 500 which may be employed in the context of the present invention. While one specific implementation of a tape drive 500 is shown in FIG. 5, it should be noted that the embodiments of the previous figures may be implemented in the context of any type of tape drive system.

As shown, a tape supply cartridge 520 and a take-up reel 521 are provided to support a tape 522. These may form part of a removable cassette and are not necessarily part of the system. Guides 525 guide the tape 522 across a preferably bidirectional tape head 526, of the type disclosed herein. An actuator 532 controls position of the head 526 relative to the tape 522. The tape head 526 is in turn coupled to a controller assembly 528 via a connector cable 530. The controller 528, in turn, controls head functions such as servo following, write functions and read functions, etc. The controller 528 runs under the control of computer instructions typically in firmware or software run locally or on a host system.

A tape drive, such as that illustrated in FIG. 5, includes drive motor(s) to drive the tape supply cartridge 520 and the take-up reel 521 to move the tape 522 linearly over the head 526. The tape drive also includes a read/write channel to transmit data to the head 526 to be recorded on the tape 522 and to receive data read by the head 526 from the tape 522. An interface is also provided for communication between the tape drive and a host (integral or external) to send and receive the data and for controlling the operation of the tape drive and communicating the status of the tape drive to the host, all as will be understood by those of skill in the art. Examples of a host system include a computer or other processor-based system or network, etc. in communication with the interface device.

Figure 6:
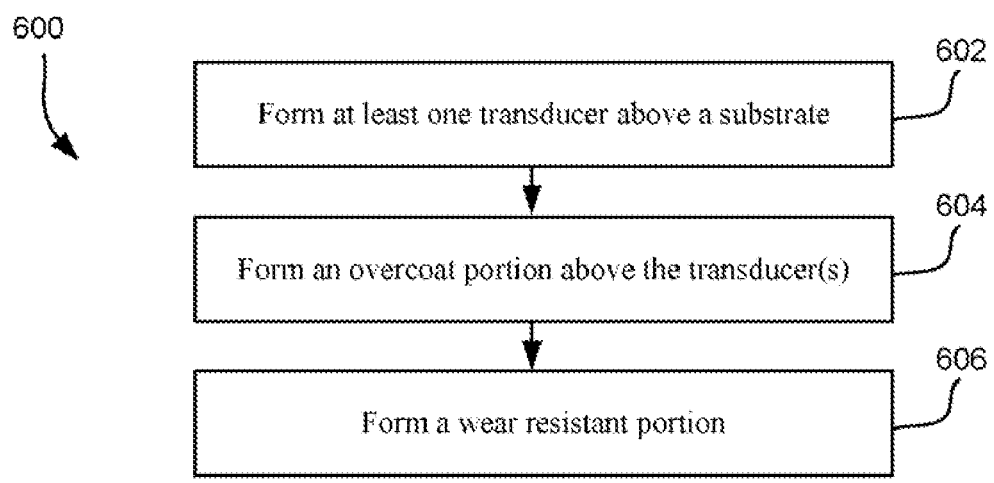
FIG. 6 is a flow diagram depicting a general method for forming a magnetic head according to one embodiment of the present invention.

The processing for forming the wear resistant portion adjacent the overcoat portion is straightforward. FIG. 6 illustrates a general method 600 for forming a magnetic head. In operation 602, at least one transducer is formed above a substrate using known methods and materials. In operation 604, an overcoat portion is formed above the at least one transducer. In operation 606, a wear resistant portion is formed, before or after forming the overcoat portion, such that the wear resistant portion is positioned between the overcoat portion and a media-proximal surface of the magnetic head. The wear resistant portion may have any combination of the properties presented herein.

Figure 7A:
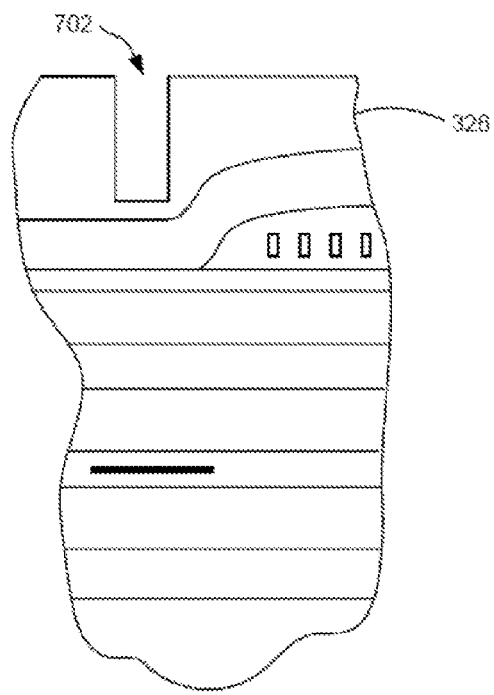
FIGS 7A-D graphically depict illustrative processing steps for forming a head having a wear resistant portion.
Figure 7B:
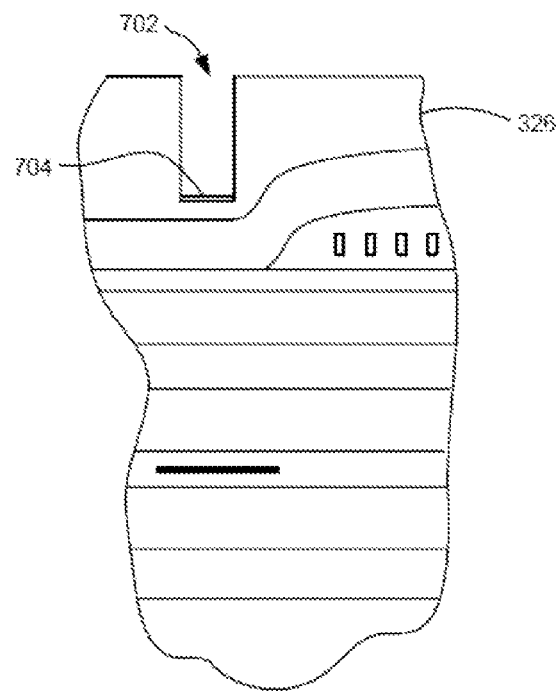
Figure 7C:
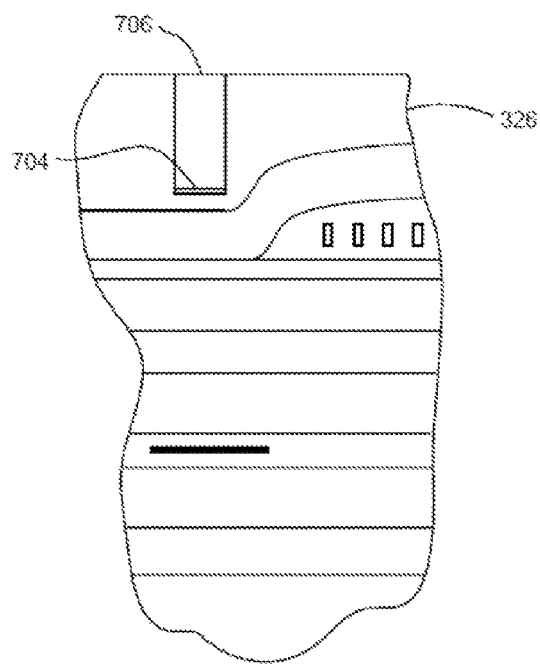
Figure 7D:
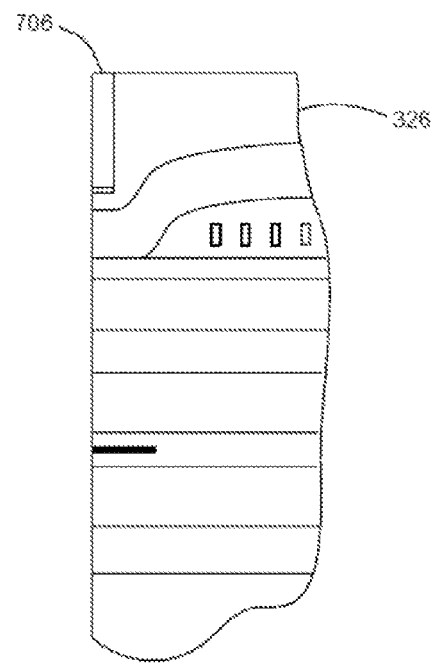

FIGS. 7A-D graphically depict illustrative processing steps for forming a head having a wear resistant portion. As shown in FIG. 7A, after forming the overcoat portion 326, an opening 702 is formed in the overcoat portion using conventional processes, e.g., photolithographic masking and milling. Referring to FIG. 7B, if needed, a seed layer 704 is formed in the opening 702, e.g., using a damascene process. Referring to FIG. 7C, a wear resistant material 706 is formed in the void, e.g., by plating. As shown in FIG. 7D, the finished structure is lapped.

Figure 8B:
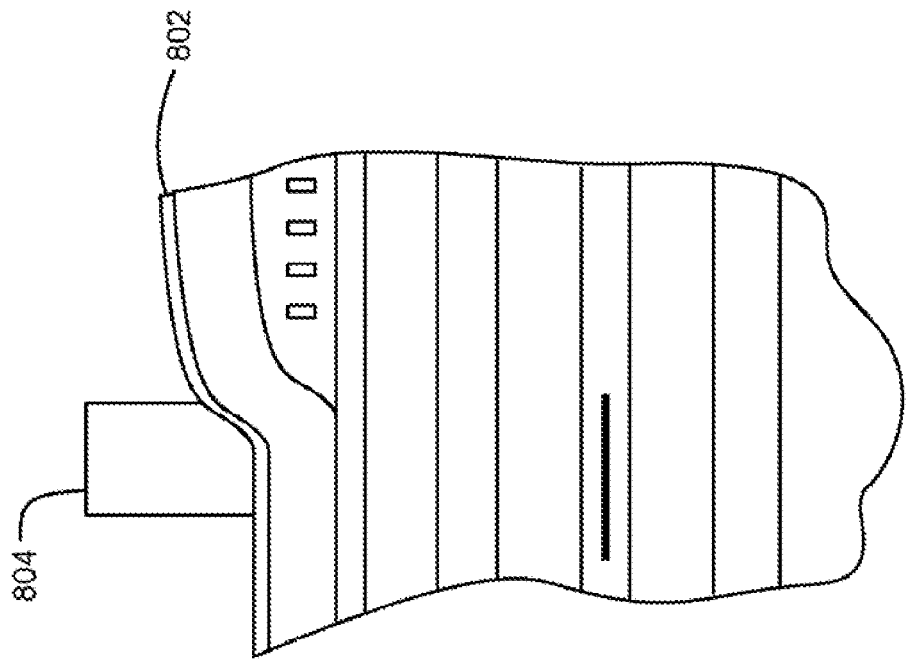
FIGS. 8A-G graphically depict illustrative processing steps for forming a head having a wear resistant portion.
Figure 8A:
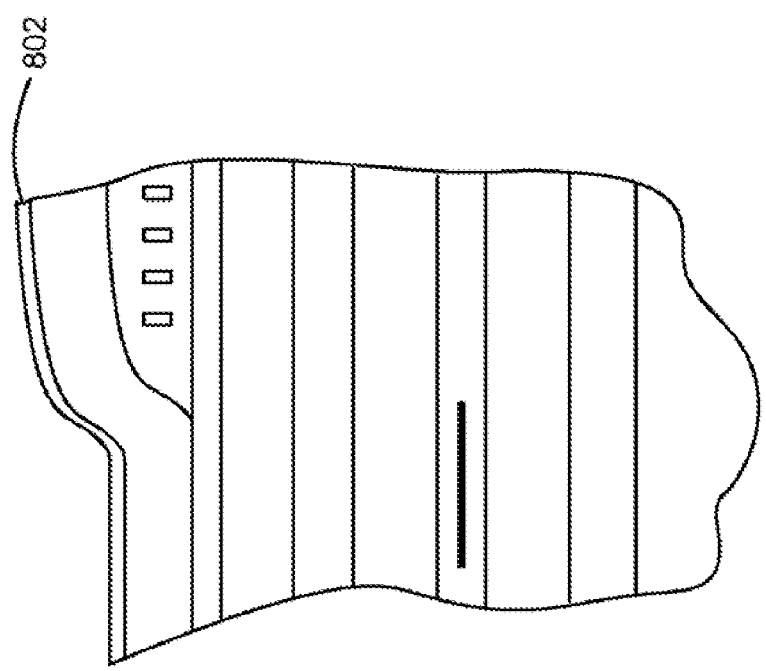
Figure 8D:
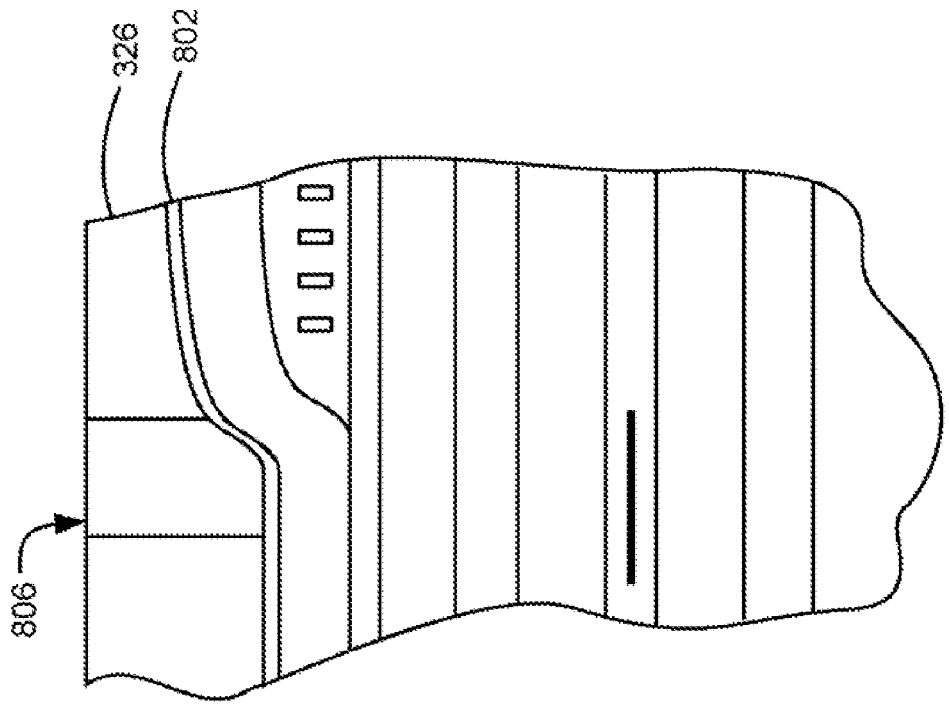
Figure 8C:
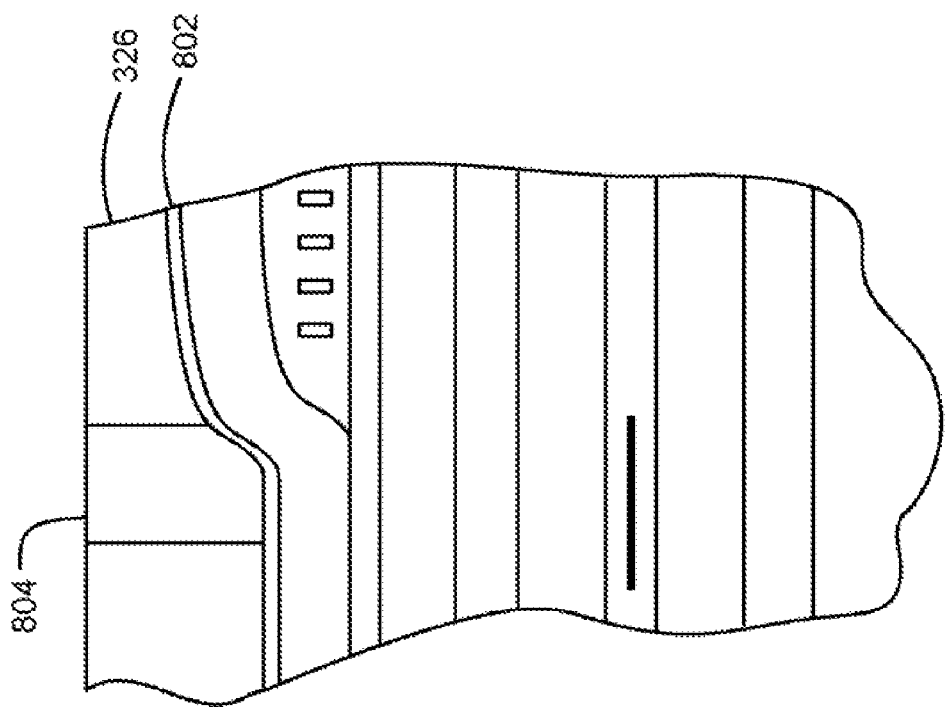
Figure 8F:
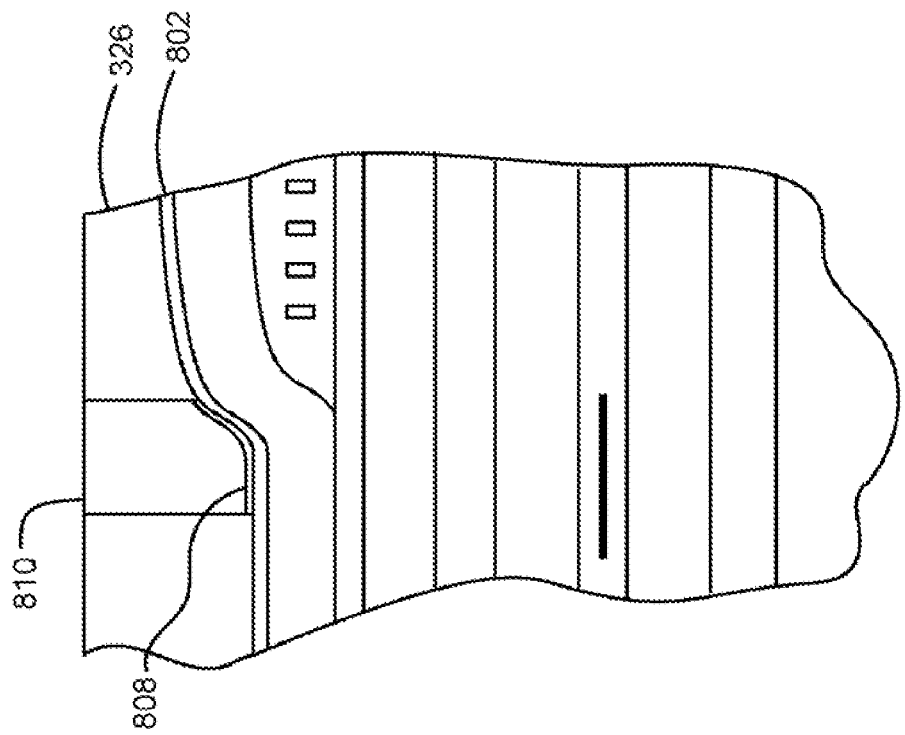
Figure 8E:
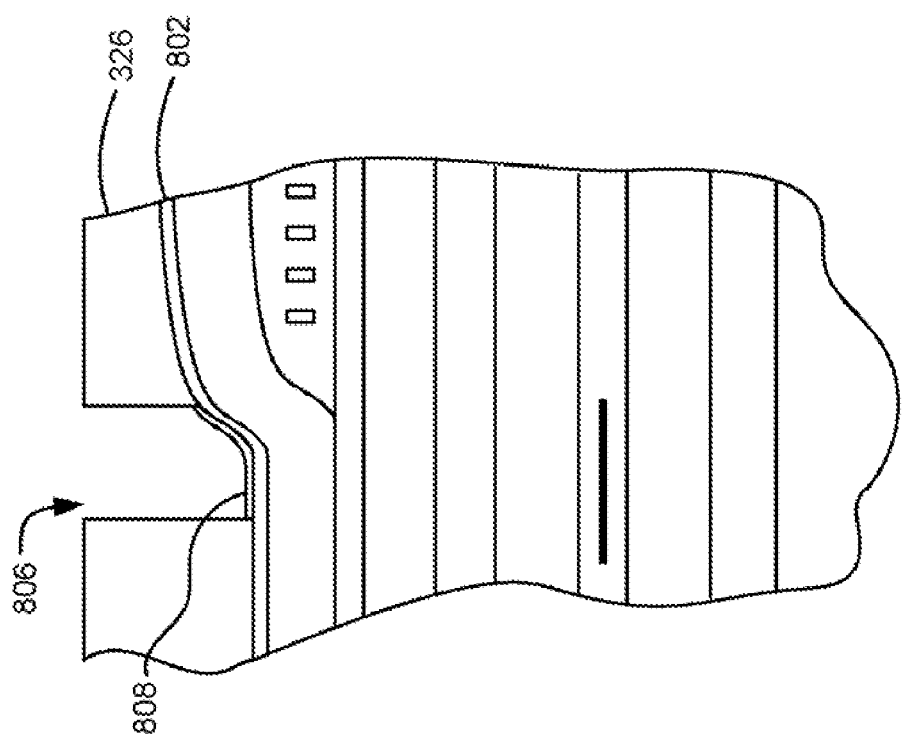
Figure 8G:
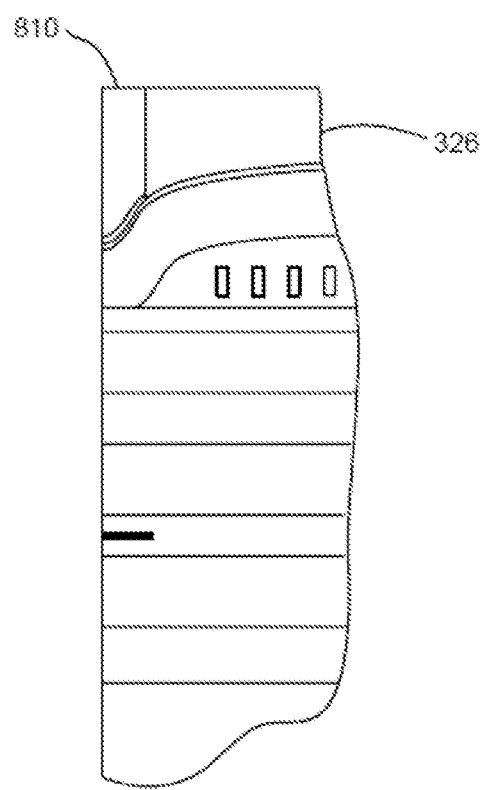

FIGS. 8A-G graphically depict illustrative processing steps for forming a head having a wear resistant portion. As shown in FIG. 8A, an insulating layer 802 is formed above the transducers. As shown in FIG. 8B, a mask 804, e.g., of photoresist, is formed above the insulating layer 802. As shown in FIG. 8C, an overcoat portion 326 is formed, e.g., by sputtering and then planarizing, e.g., by chemical mechanical polishing. Referring to FIG. 8D, the mask is removed, e.g., using a solvent or by etching, to create an opening 806. Referring to FIG. 8E, if needed, a seed layer 808 is formed in the opening 806, e.g., using a damascene process or by sputtering. Referring to FIG. 8F, a wear resistant material 810 is formed in the void, e.g., by plating. As shown in FIG. 8G, the finished structure is lapped.

Figure 9A:
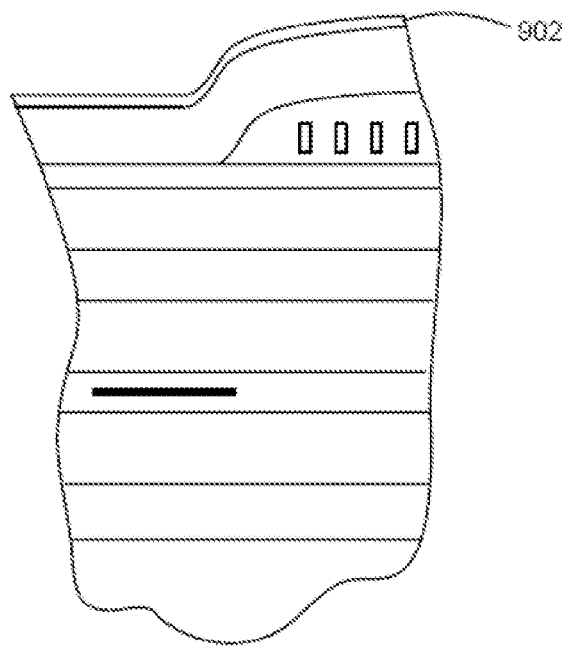
FIGS. 9A-G graphically depict illustrative processing steps for forming a head having a wear resistant portion.
Figure 9B:
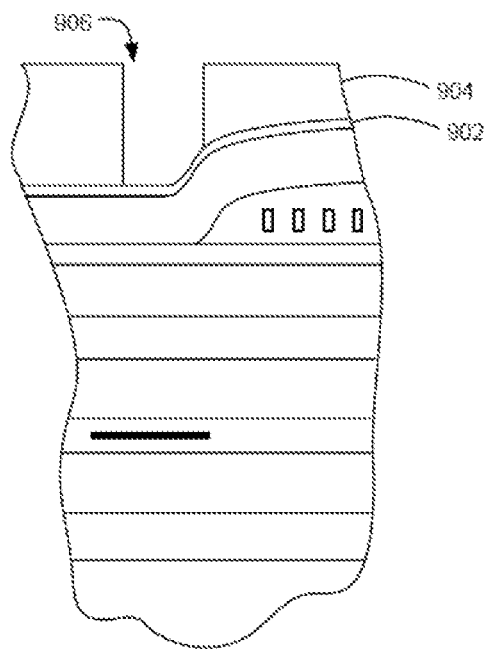
Figure 9C:
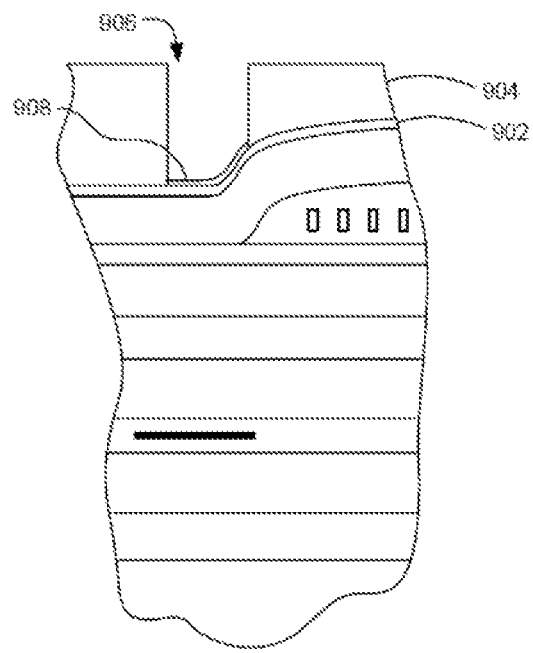
Figure 9D:
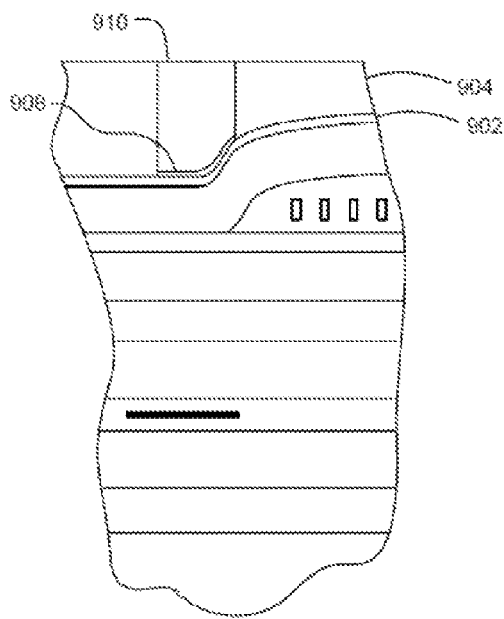
Figure 9E:
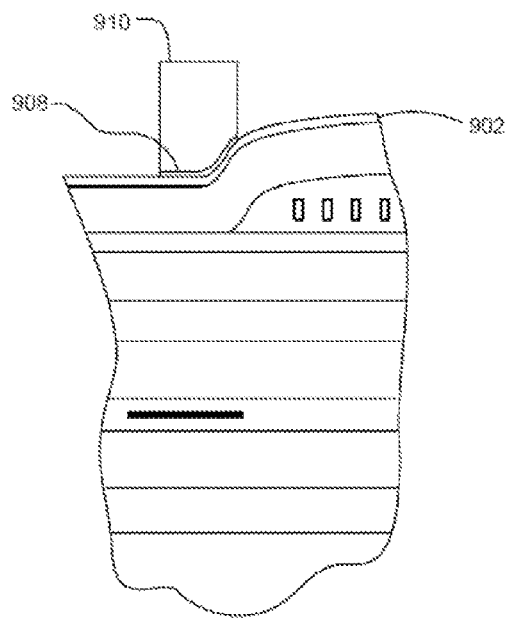
Figure 9F:
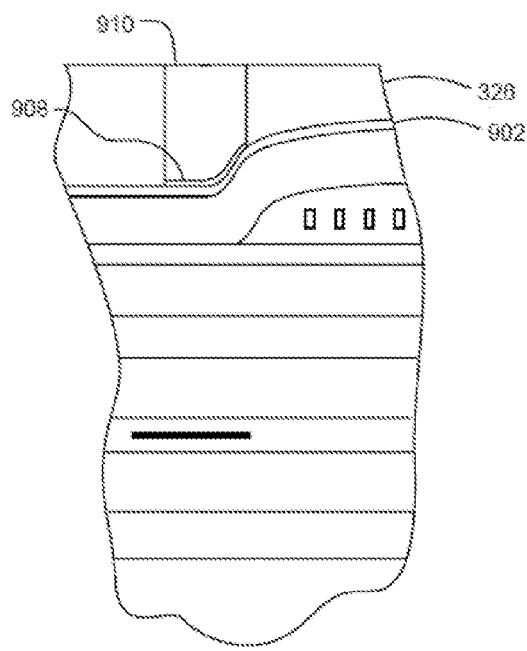
Figure 9G:
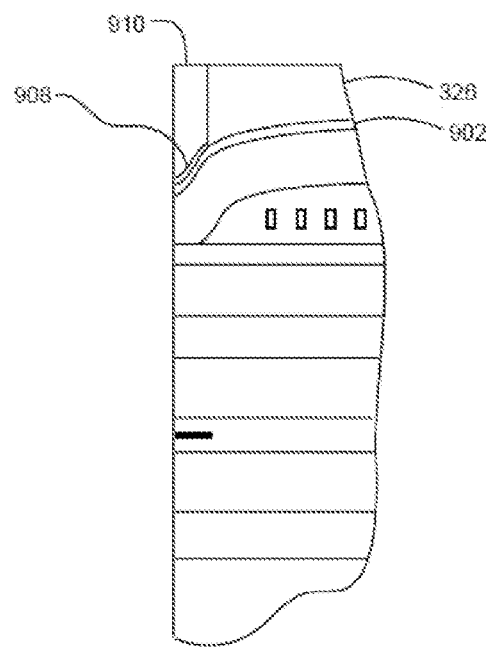

FIGS. 9A-G graphically depict illustrative processing steps for forming a head having a wear resistant portion. As shown in FIG. 9A, an insulating layer 902 is formed above the transducers. As shown in FIG. 9B, a mask 904, e.g., of photoresist is formed above the insulating layer 902 and an opening 906 is photolithographically formed. Referring to FIG. 9C, if needed, a seed layer 908 is formed in the void 906, e.g., using a damascene process or by sputtering. Referring to FIG. 9D, a wear resistant material 910 is formed in the void, e.g., by plating. Referring to FIG. 9E, the mask is removed. As shown in FIG. 9F, an overcoat portion 326 is formed, e.g., by sputtering. As shown in FIG. 9G, the finished structure is lapped.

Figure 10B:
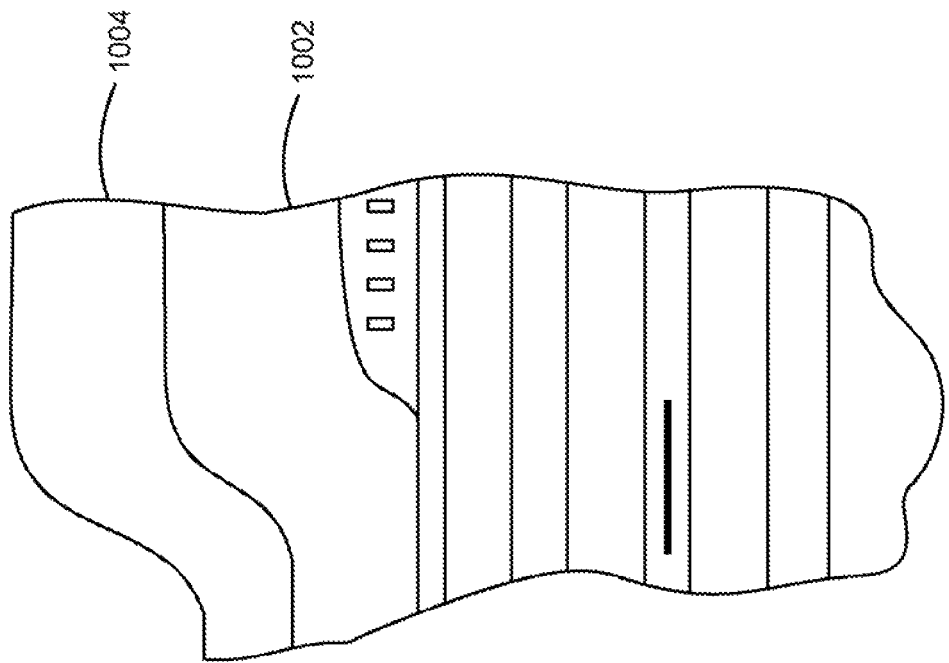
FIGS. 10A-E graphically depict illustrative processing steps for forming a head having a wear resistant portion.
Figure 10A:
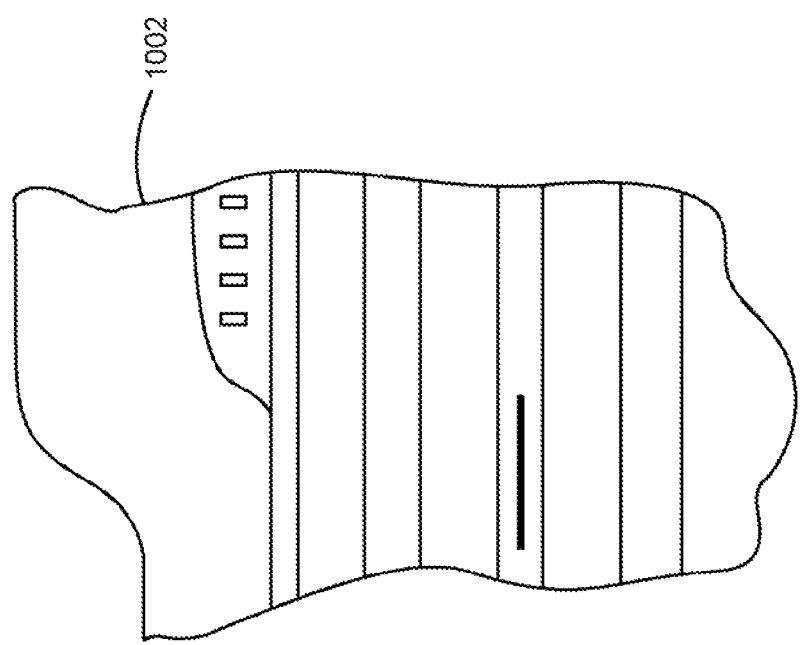
Figure 10D:
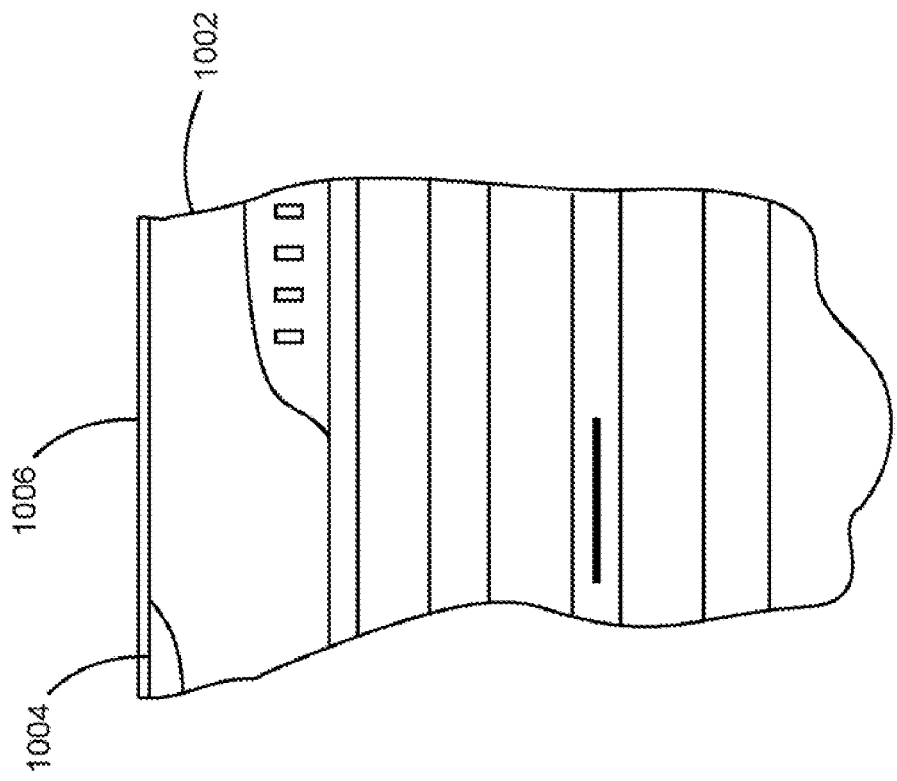
Figure 10C:
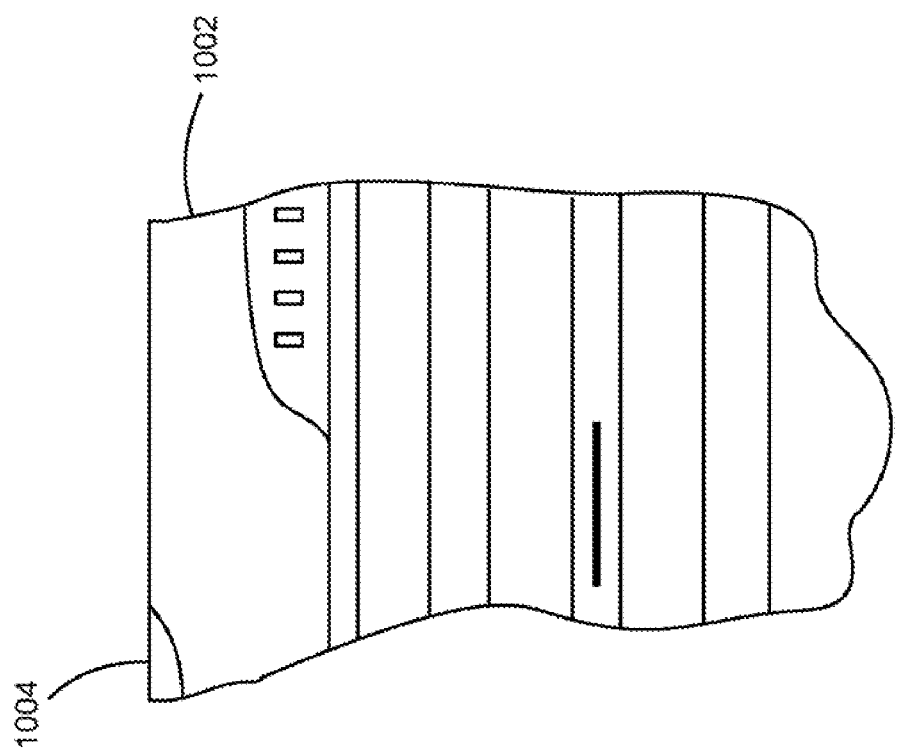
Figure 10E:
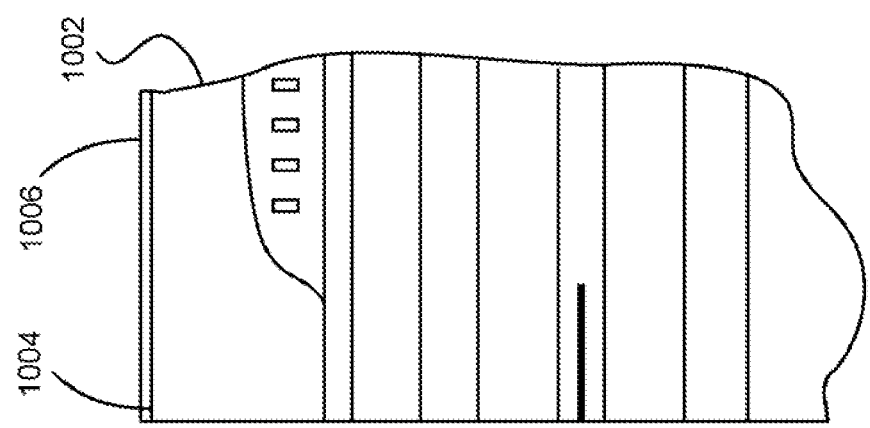

FIGS. 10A-D graphically depict illustrative processing steps for forming a head having a wear resistant portion that is integral to the write pole. As shown in FIG. 10A, the upper write pole 1002 is plated to a predetermined thickness. As shown in FIG. 10B, an overcoat layer 1004 is deposited over the structure. Referring to FIG. 10C, the structure is planarized using, e.g., chemical mechanical polishing, to achieve the cross sectional profile shown, in which the overcoat portion above the upper write pole 1002. Referring to FIG. 10D, an insulating layer 1006 may be added to isolate the pole 1002 from the closure. As shown in FIG. 10E, the finished structure is lapped. As shown, the overcoat portion above the pole tip of the upper write pole 1002 may be eliminated, or a small portion thereof may remain.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   a substrate;
   at least one transducer formed above the substrate, the at least one transducer being selected from a group consisting of a reader and a writer;
   an overcoat portion formed above the at least one transducer; and
   a wear resistant portion formed between the overcoat portion and a media-proximal surface of the magnetic head, the wear resistant portion being oriented relative to the overcoat portion in a direction normal to the media-proximal surface, the wear resistant portion being formed of a material having a greater resistance to media wear than a material from which the overcoat portion is formed.

2. A magnetic head as recited in claim 1, wherein the at least one transducer includes a writer having a write pole, wherein the wear resistant portion is formed of a same material as the write pole.

3. A magnetic head as recited in claim 1, wherein the wear resistant portion includes iron.

4. A magnetic head as recited in claim 3, wherein the wear resistant portion is formed of a nickel iron alloy.

5. A magnetic head as recited in claim 3, wherein the wear resistant portion is formed of an aluminum-iron-silicon containing material.

6. A magnetic head as recited in claim 3, wherein the wear resistant portion includes a nitrogenated iron-containing material.

7. A magnetic head as recited in claim 1, wherein the wear resistant portion is a laminated structure.

8. A magnetic head as recited in claim 1, wherein the wear resistant portion has a height of between about 1 and 5 micrometers as measured in a direction perpendicular to the media-proximal surface.

9. A magnetic head as recited in claim 1, further comprising a protective coating formed along the media-proximal surface of the head.

10. A magnetic head as recited in claim 1, further comprising an undercoat portion positioned between the substrate and the at least one transducer, and a second wear resistant portion positioned between the undercoat portion and the media-proximal surface of the magnetic head.

11. A magnetic storage system, comprising:
    a magnetic head as recited in claim 1;
    a drive mechanism for passing a magnetic recording tape over the head; and
    a controller in communication with the head.

12. A magnetic head, comprising:
    a substrate;
    at least one transducer formed above the substrate, the at least one transducer being selected from a group consisting of a reader and a writer;

an overcoat portion formed above the at least one transducer;

a wear resistant portion positioned along a plane of deposition of the overcoat portion between the overcoat portion and a media-proximal surface of the magnetic head, the wear resistant portion being formed of a material that moderates electric fields emanating from the closure.

13. A magnetic head as recited in claim 12, wherein the at least one transducer includes a writer having a write pole, wherein the wear resistant portion is formed of a same material as the write pole.

14. A magnetic head as recited in claim 12, wherein the wear resistant portion includes iron.

15. A magnetic head as recited in claim 12, wherein the wear resistant portion is a laminated structure.

16. A magnetic storage system, comprising:
a magnetic head as recited in claim 12;
a drive mechanism for passing a magnetic recording tape over the head; and
a controller in communication with the head.

17. A magnetic head, comprising:
a substrate;
at least one writer having a write pole and being formed above the substrate;
an overcoat portion formed above the at least one writer; and
a wear resistant portion formed at least partially between the write pole and a lapped surface of the magnetic head, the wear resistant portion being positioned relative to the write pole in a direction normal to the lapped surface, the wear resistant portion being formed of a material having a greater resistance to media wear than a material from which the overcoat portion is formed.

18. A magnetic head as recited in claim 17, wherein the wear resistant portion is formed of a same material as the write pole.

19. A magnetic head as recited in claim 17, wherein the wear resistant portion is integral to the write pole.

20. A method for forming a magnetic head, comprising:
forming at least one transducer above a substrate, the at least one transducer being selected from a group consisting of a reader and a writer;
forming an overcoat portion above the at least one transducer; and
forming a wear resistant portion, before or after forming the overcoat portion, such that the wear resistant portion is positioned along a plane of deposition of the overcoat portion between the overcoat portion and a media-proximal surface of the magnetic head upon forming both the overcoat portion and the wear resistant portion, the wear resistant portion being formed of a material having a greater resistance to media wear than a material from which the overcoat portion is formed.

* * * * *